(12) United States Patent
Rawas

(10) Patent No.: US 11,504,912 B2
(45) Date of Patent: Nov. 22, 2022

(54) SELECTIVE END EFFECTOR MODULAR ATTACHMENT DEVICE

(71) Applicant: DIVERGENT TECHNOLOGIES, INC., Los Angeles, CA (US)

(72) Inventor: Oussama Rawas, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 207 days.

(21) Appl. No.: 16/688,365

(22) Filed: Nov. 19, 2019

(65) Prior Publication Data

US 2020/0156320 A1 May 21, 2020

Related U.S. Application Data

(60) Provisional application No. 62/770,133, filed on Nov. 20, 2018.

(51) Int. Cl.
| | | |
|---|---|---|
| *B29C 64/379* | (2017.01) | |
| *G05B 19/402* | (2006.01) | |
| *B29C 64/106* | (2017.01) | |
| *B29C 64/393* | (2017.01) | |

(52) U.S. Cl.
CPC .......... *B29C 64/379* (2017.08); *B29C 64/106* (2017.08); *B29C 64/393* (2017.08); *G05B 19/402* (2013.01)

(58) Field of Classification Search
CPC .................................................. B29C 64/379
See application file for complete search history.

(56) References Cited

U.S. PATENT DOCUMENTS

| | | |
|---|---|---|
| 5,107,716 A | 4/1992 | Torii et al. |
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,084,373 A | 7/2000 | Goldenberg et al. |
| 6,096,249 A | 8/2000 | Yamaguchi |

(Continued)

FOREIGN PATENT DOCUMENTS

| | | |
|---|---|---|
| CN | 108081313 A | 5/2018 |
| DE | 102010054739 A1 | 6/2012 |

(Continued)

OTHER PUBLICATIONS

US 9,202,136 B2, 12/2015, Schmidt et al. (withdrawn)

(Continued)

*Primary Examiner* — Nathan T Leong
(74) *Attorney, Agent, or Firm* — ArentFox Schiff LLP

(57) ABSTRACT

In the present disclosure, systems and apparatuses for enabling modular attachment of a plurality of devices are described. In one aspect, an apparatus may include a center rail having a distal end and a proximal end. The apparatus may further include a first flange coupled with the proximal end and a second flange coupled with the distal end. The apparatus may further include a collar disposed around the center rail and between the first flange and the second flange. The apparatus may further include at least one arm connected with the collar, and the at least one arm may be configured to connect with a modular attachment.

13 Claims, 9 Drawing Sheets

(56) References Cited

U.S. PATENT DOCUMENTS

| | | |
|---|---|---|
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,418,341 B1 | 4/2013 | Fisher |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |

(56) References Cited

U.S. PATENT DOCUMENTS

| | | |
|---|---|---|
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |

(56) References Cited

U.S. PATENT DOCUMENTS

| | | | |
|---|---|---|---|
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2003/0159535 A1 | 8/2003 | Grover et al. |
| 2006/0108783 A1 | 5/2006 | Ni et al. |
| 2010/0329408 A1* | 12/2010 | Fiodorov ............. G21C 17/017 976/DIG. 245 |
| 2014/0277669 A1 | 9/2014 | Nardi et al. |
| 2017/0113344 A1 | 4/2017 | Schönberg |
| 2017/0297819 A1 | 10/2017 | Andrews et al. |
| 2017/0341309 A1 | 11/2017 | Piepenbrock et al. |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Jorge Corona-Gastuera et al,; "An Approach for Intelligent Fixtureless Assembly: Issues and Experiments;" A. Gelbukh, A. de Albornoz, and H. Terashima (Eds.): MICAI 2005, LNAI 3789, pp. 1052-1061, 2005. © Springer-Verlag Berlin Heidelberg 2005.
Bone, G. and Capson D., "Vision-Guided fixtureless Assembly of Automotive Components", Robotics and Computer Integrated Manufacturing, vol. 19, pp. 79-87, 2003. DOI: 10.1016/S0736-5845(02)00064-9.
Ogun, P. et al., 2015. "3D Vision Assisted Flexible Robotic Assembly of Machine Components." IN: Proceedings of 2015 8th International Conference on Machine Vision (ICMV 2015), Barcelona, spain, Nov. 19-21, 2015 (Proceedings of SPIE, 9878, DOI: 10.1117/12.2229053).
James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. IEEE International Conference on Robotics and Automation 0-7803-1965-6/95 $4.00 © 1995 IEEE.
Notification of the First Office Action received in Chinese Patent Application No. 201922013577.7 dated Jun. 1, 2020.
International Search Report & Written Opinion received in PCT/US2019/062357 dated Mar. 3, 2020.
Invitation to Pay Additional Fees received in PCT/US2019/062357 dated Nov. 20, 2019.
Supplementary European Search Report issued in corresponding European Patent Application No. 19886196.5, dated Aug. 12, 2022.

* cited by examiner

SELECTIVE END EFFECTOR MODULAR ATTACHMENT DEVICE

CROSS REFERENCE TO RELATED APPLICATION(S)

This application claims the benefit of U.S. Provisional Application Ser. No. 62/770,133, titled "SELECTIVE END EFFECTOR MODULAR ATTACHMENT DEVICE" and filed on Nov. 20, 2018, the disclosure of which is expressly incorporated herein by reference in its entirety.

BACKGROUND

Field

The present disclosure relates to robots configured for assembly operations, and more specifically to components configured to connect with robotic arms for assembly operations.

Background

A transport structure such as an automobile, truck or aircraft employs a large number of interior and exterior nodes. These nodes provide structure to the automobile, truck and aircraft, and respond appropriately to the many different types of forces that are generated or that result from various actions like accelerating and braking. These nodes also provide support. Nodes of varying sizes and geometries may be integrated in a transport structure, for example, to provide an interface between panels, extrusions, and/or other structures. Thus, nodes are an integral part of transport structures.

Most nodes must be coupled to, or interface securely with, another part or structure in secure, well-designed ways. In order to securely connect a node with another part or structure, the node may need to undergo one or more processes in order to prepare the node to connect with the other part or structure. For example, the node may be machined at an interface in order to connect with various other parts or structures. Further examples of processes include surface preparation operations, heat treatment, electrocoating, electroplating, anodization, chemical etching, cleaning, support removal, powder removal, and so forth.

In order to produce a transport structure (e.g., a vehicle, an aircraft, a metro system, etc.), one or more assembly operations may be performed after a node is constructed. For example, a node may be connected with a part, e.g., in order to form a portion of a transport structure (e.g., a vehicle chassis, etc.). Such assembly may involve a degree of accuracy that is within one or more tolerance thresholds of an assembly system, e.g., in order to ensure that the node is securely connected with the part and, therefore, the transport structure may be satisfactorily produced.

When robots (e.g., robotic arms) perform assembly operations, the robots may engage with different nodes, parts, and/or other structures of varying geometries (e.g., different shapes, sizes, dimensions, etc.). Thus, a need exists for an approach to enabling robots to engage with different nodes, parts, and/or other structures, as well as enabling robots to perform various assembly operations.

SUMMARY

The present disclosure generally relates to assembly operations performed in association with production of transport structures. Such assembly operations may include connection of nodes (e.g., additively manufactured nodes) with parts and/or other structures. Because transport structures are to be safe, reliable, and so forth, approaches to accurately performing various assembly operations associated with production of transport structures may be beneficial. Such approaches to various assembly operations may be performed by at least one robotic arm that may be instructed via computer-generated instructions. Accordingly, a computer may implement various techniques to generate instructions for at least one robotic arm that causes the at least one robotic arm to be correctly position when performing various assembly operations.

In the present disclosure, systems and apparatuses for enabling modular attachment of a plurality of devices are described. In some embodiments, an apparatus may include a center rail having a distal end and a proximal end. The apparatus may include a first flange connected with the proximal end. The apparatus may include a second flange connected with the distal end. The apparatus may include a collar disposed around the center rail and between the first flange and the second flange. The apparatus may include at least one arm connected with the collar, and the at least one arm is configured to connect with a modular attachment.

In one embodiment, the disposal of the collar around the center rail is configured to provide at least two degrees of freedom for movement of the modular attachment, and the at least one arm is configured to provide at least four degrees of freedom for the movement of the modular attachment. In one embodiment, the at least one arm includes at least one hinge configured to provide at least one of the four degrees of freedom. In one embodiment, the collar is configured for movement along the center rail between the first flange and the second flange, and the movement along the center rail is configured to provide at least one of the at least two degrees of freedom. In one embodiment, the center rail includes at least one slot configured to connect with at least one module, and provide at least one of radial positioning or axial positioning. In one embodiment, the apparatus further includes a bracket connected with at least one of the first flange or the second flange.

In some other embodiments, an apparatus may include an extension configured with at least one keyway and connected with at least a first flange, and the first flange is configured to connect the extension with one of a plurality of different robots. The apparatus may include a collar arranged around the extension configured to connect with one of a plurality of different modular attachments, and the collar is configured to interlock with the at least one keyway, and the apparatus is configured to allow movement in 6 degrees of freedom (6DoF) to the connected one of the plurality of different modular attachments.

In one embodiment, the apparatus further includes at least one arm connected with the collar, and the at least one arm is configured to connect the collar with the one of the plurality of different modular attachments. In one embodiment, the collar is configured to allow the movement in at least two degrees of the 6DoF to the connected one of the plurality of different modular attachments, and the at least one arm is configured to allow at least four degrees of the 6DoF to the connected one of the plurality of different modular attachments. In one embodiment, the at least one arm includes at least one hinge configured to allow at least one degree of the 6DoF to the connected one of the plurality of different modular attachments. In one embodiment, the extension is connected with the first flange at a first end of the extension that is opposite from a second end of the extension with which a second flange is connected. In one embodiment, the second flange is configured to further connect the extension with the one of the plurality of different robots. In one embodiment, the second flange is configured to connect the extension with a tool associated with vehicle assembly. In one embodiment, the apparatus further includes modular bracketry connected with at least one of the first flange or the second flange and further connected with the tool.

It will be understood that other aspects of mechanisms for operations with robotic apparatuses will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

DETAILED DESCRIPTION

Figure 1:
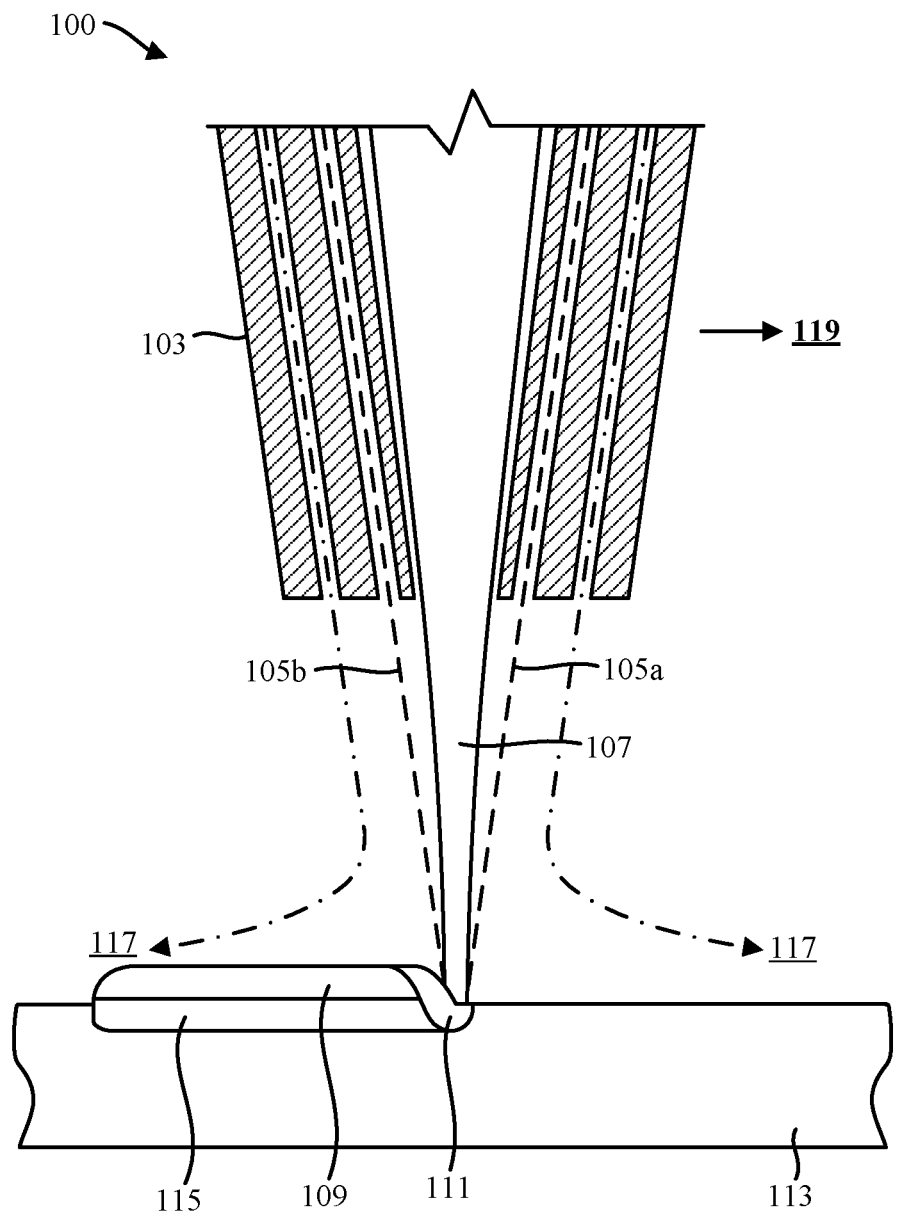
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The terms "exemplary," "illustrative," and the like used throughout the present disclosure mean "serving as an example, instance, or illustration," and should not necessarily be construed as preferred or advantageous over other embodiments presented in the present disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described.

Additive Manufacturing (3-D Printing).

Additive manufacturing (AM) is advantageously a non-design specific manufacturing technique. AM provides the ability to create complex structures within a part. For example, nodes can be produced using AM. A node is a structure that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected to a node using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with little or no wasted motion. As another illustration, electron beam additive manufacturing processes use an electron beam to fuse metal via wire feedstock or sintering on a powder bed in a vacuum chamber. Atomic Diffusion Additive Manufacturing (ADAM) is still another recently developed technology in which components are printed, layer-by-layer, using a metal powder in a plastic binder. After printing, plastic binders are removed and the entire part (e.g., structure) is sintered at once into a desired metal.

One of several such AM techniques, as noted, is DMD. FIG. 1 illustrates an example embodiment of certain aspects of a DMD 3-D printer 100. DMD printer 100 uses a feed nozzle 103 moving in a predefined direction 119 to propel powder streams 105a and 105b into a laser beam 107, which is directed toward a workpiece 113 that may be supported by a substrate. Feed nozzle may also include mechanisms for streaming a shield gas 117 to protect the welded area from oxygen, water vapor, or other components.

The powdered metal is then fused by the laser 107 in a melt pool region 111, which may then bond to the workpiece 113 as a region of deposited material 109. A dilution area 115 may include a region of the workpiece where the deposited powder is integrated with the local material of the workpiece. Feed nozzle 103 may be supported by a computer numerical controlled (CNC) robot or a gantry, or other computer-controlled mechanism. Feed nozzle 103 may be moved under computer control multiple times along a predetermined direction of the substrate until an initial layer of the deposited material 109 is formed over a desired area of workpiece 113. Feed nozzle 103 can then scan the region immediately above the prior layer to deposit successive layers until the desired structure is formed. In general, feed nozzle 103 may be configured to move with respect to all three axes, and in some instances to rotate on its own axis by a predetermined amount.

Figure 2:
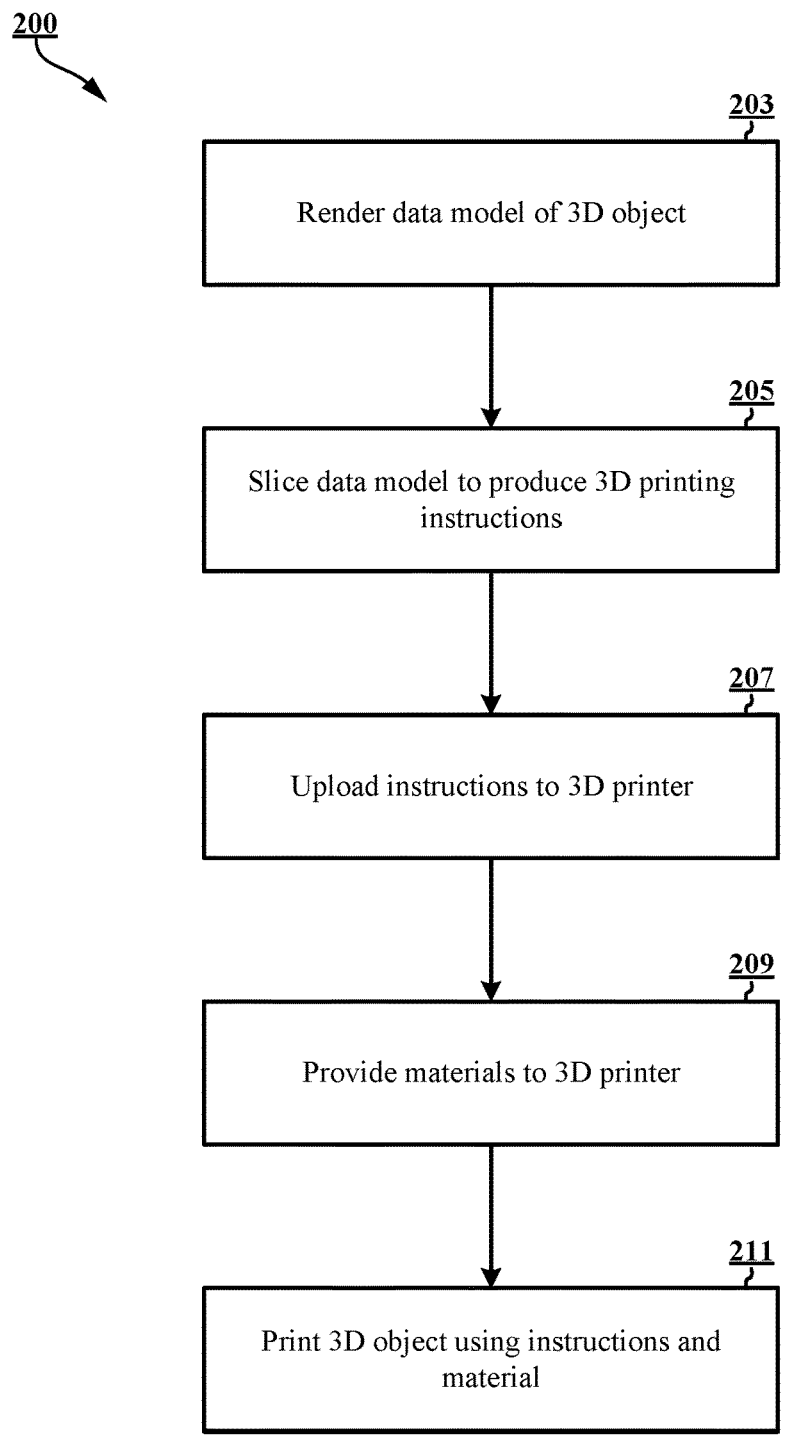
FIG. 2 illustrates a conceptual flow diagram of a 3-D printing process using a 3-D printer.

FIG. 2 is a flow diagram 200 illustrating an example process of 3-D printing. A data model of the desired 3-D object to be printed is rendered (203). A data model is a virtual design of the 3-D object. Thus, the data model may reflect the geometrical and structural features of the 3-D object, as well as its material composition. The data model may be created using a variety of methods, including computer-aided engineering (CAE) based optimization, 3-D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" (205) by a software application known as a slicer to thereby produce a set of instructions for 3-D printing the object, with the instructions being compatible and associated with the particular 3-D printing technology to be utilized. Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded (207) to the 3-D printer. Because the file containing these instructions is typically configured to be operable with a specific 3-D printing process, it will be appreciated that many formats of the instruction file are possible depending on the 3-D printing technology used.

In addition to the printing instructions that dictate what and how an object is to be printed, the appropriate physical materials necessary for use by the 3-D printer in printing the object are provided (209) to the 3-D printer using any of several conventional and often printer-specific methods (operation 240). In DMD techniques, for example, one or more metal powders may be provided for layering structures with such metals or metal alloys. In selective laser melting (SLM), selective laser sintering (SLS), and other PBF-based AM methods (see below), the materials may be provided as powders into chambers that feed the powders to a build platform. Depending on the 3-D printer, other techniques for providing printing materials may be used.

The respective data slices of the 3-D object are then printed (211) based on the provided instructions using the material(s). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part (e.g., structure) is removed from the printer. In fused deposition modelling, as described above, parts are printed by applying successive layers of model and support materials to a substrate. In general, any suitable 3-D printing technology may be employed for purposes of the present disclosure.

Another AM technique is powder-bed fusion (PBF). Like DMD, PBF creates "build pieces" layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an example PBF system 300 during different stages of operation. As noted above, the particular embodiment illustrated in FIGS. 3A-D is one of many suitable examples of a PBF system acceptable for use in the present disclosure. It should also be noted that elements of FIGS. 3A-D and the other figures in the present disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. Walls 329 of the powder bed receptacle generally define the boundaries of the powder bed receptacle, which is sandwiched between walls 329 from the side and abuts a portion of build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
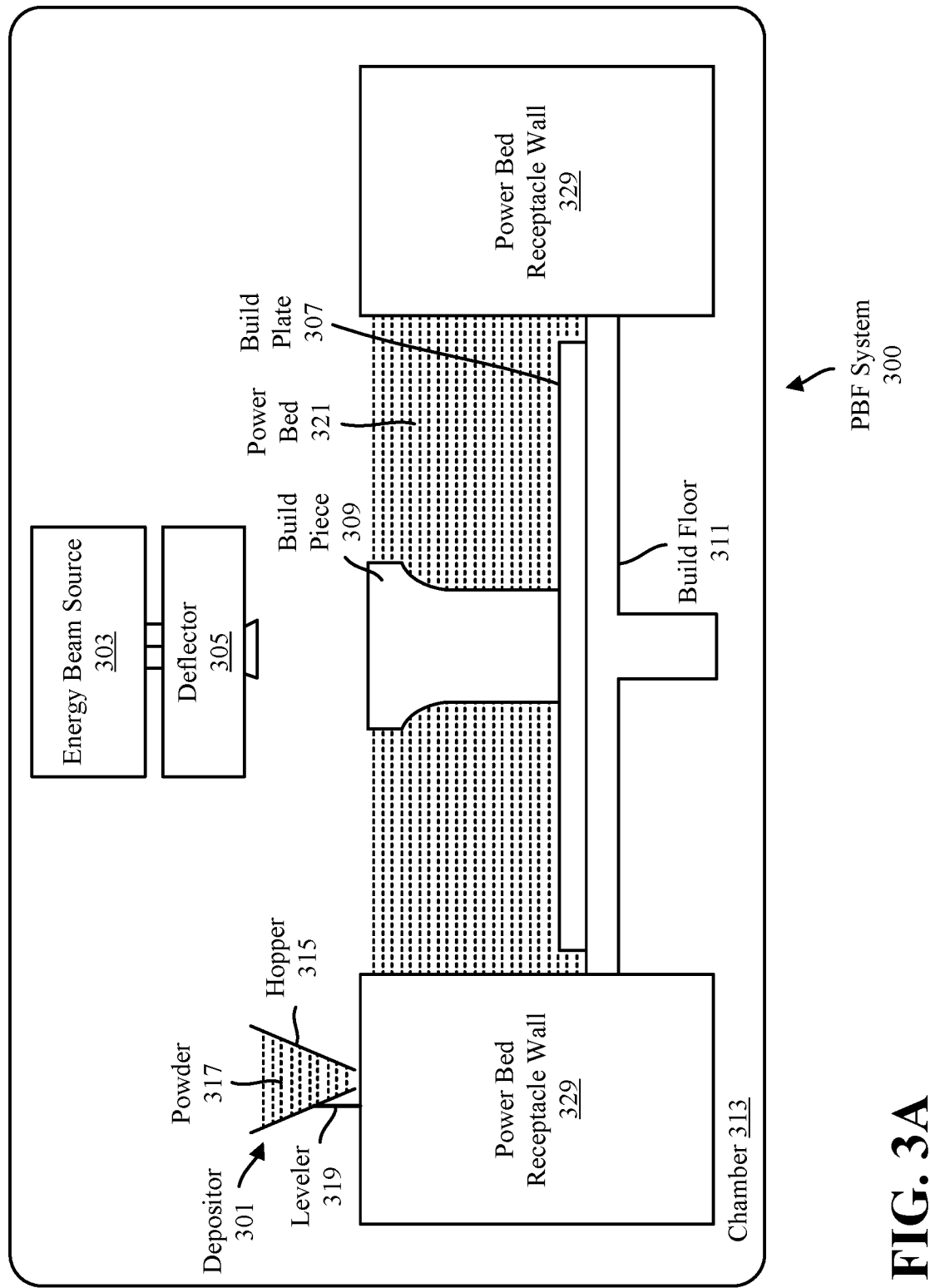
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
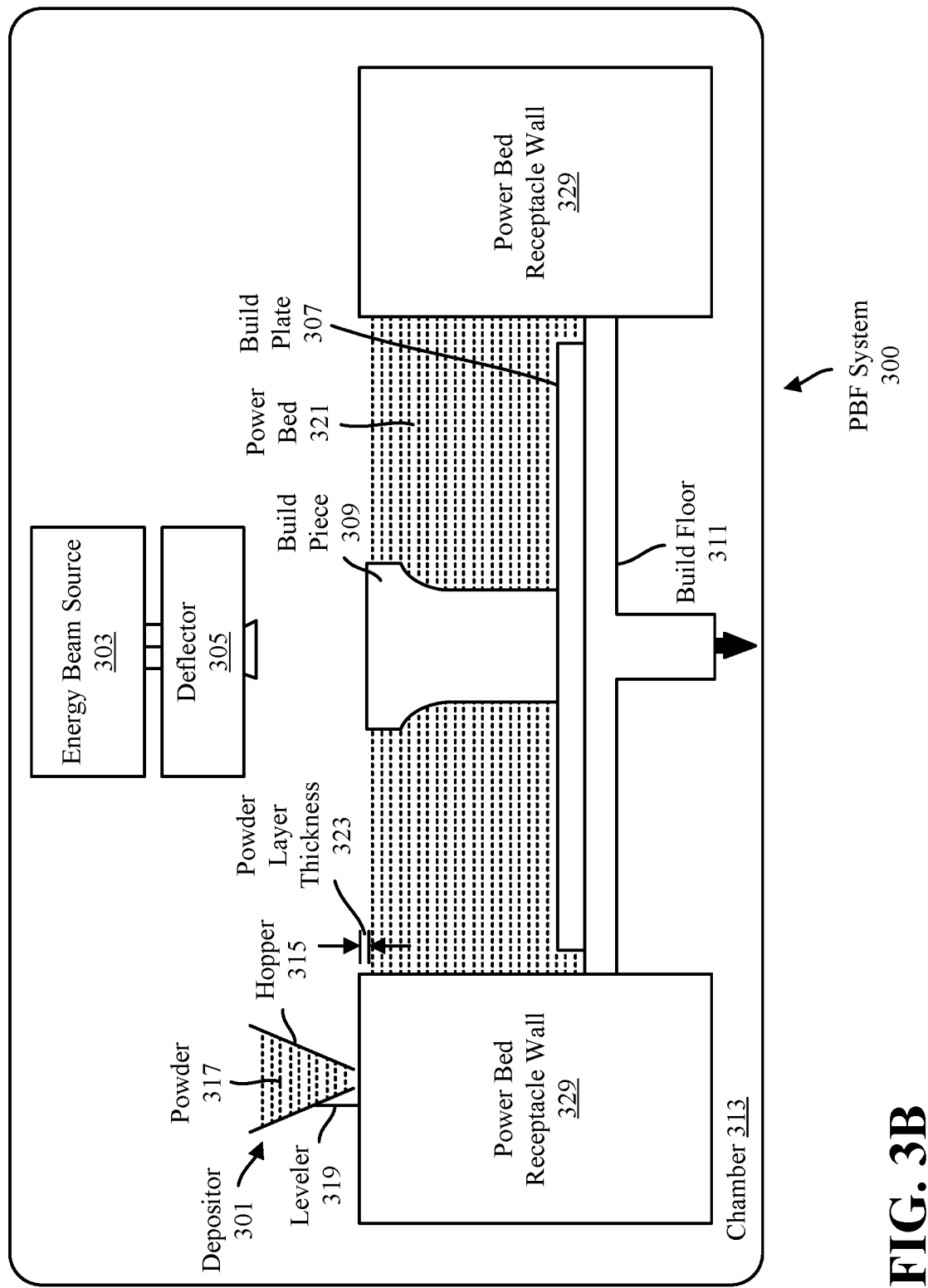

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of build piece 309 and powder bed 321 are lower than the top of powder bed receptacle wall 329 by an amount equal to powder layer thickness 323. In this way, for example, a space with a consistent thickness equal to powder layer thickness 323 can be created over the tops of build piece 309 and powder bed 321.

Figure 3C:
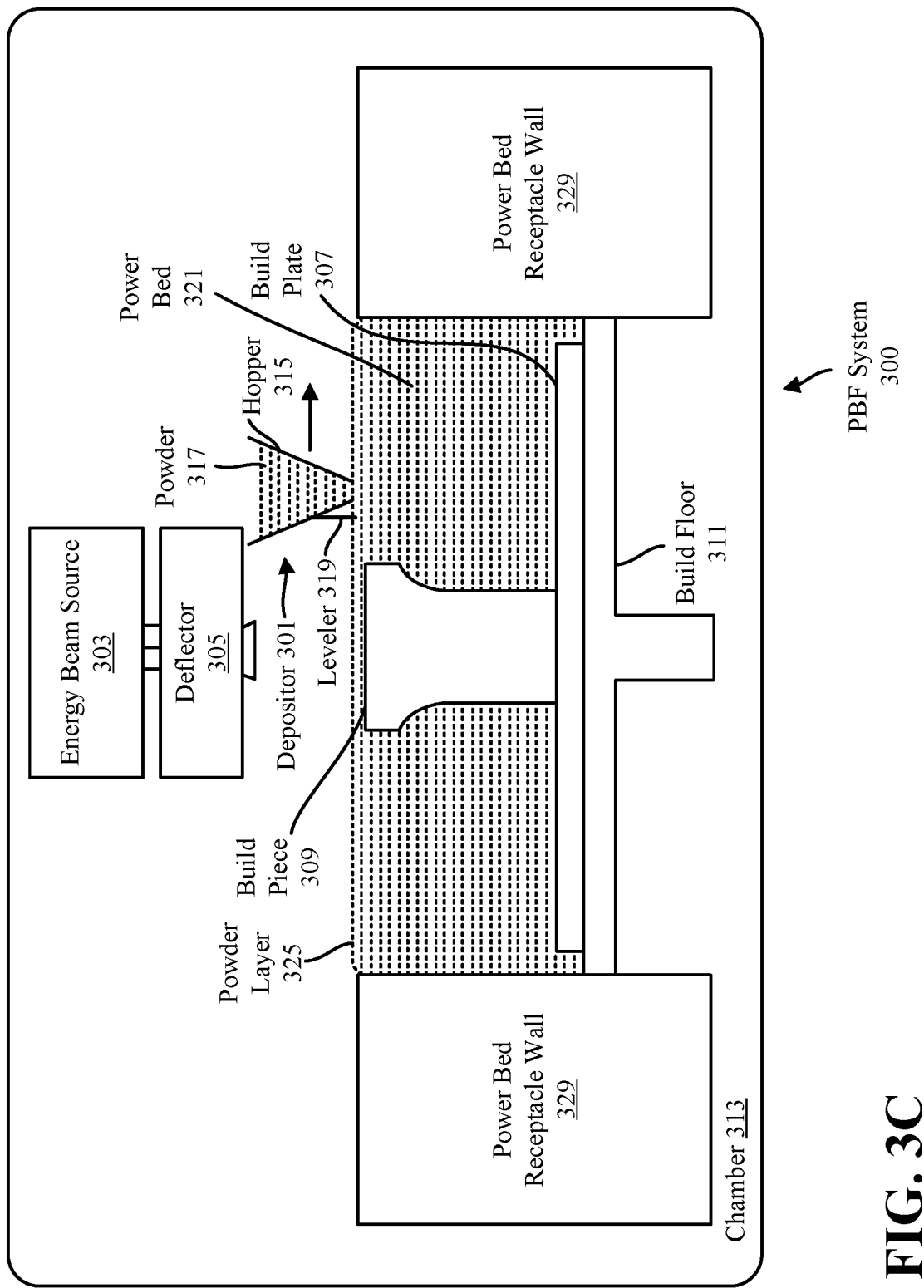

FIG. 3C shows PBF system 300 at a stage in which depositor 301 is positioned to deposit powder 317 in a space created over the top surfaces of build piece 309 and powder bed 321 and bounded by powder bed receptacle walls 329. In this example, depositor 301 progressively moves over the defined space while releasing powder 317 from hopper 315. Leveler 319 can level the released powder to form a powder layer 325 that has a thickness substantially equal to powder layer thickness 323 (as shown in FIG. 3B above). Thus, the powder in a PBF system can be supported by a powder support structure, which can include, for example, build plate 307, build floor 311, build piece 309, walls 329, and the like. It should be noted that the illustrated thickness of powder layer 325 (i.e., powder layer thickness 323 (FIG. 3B)) is greater than an actual thickness used for the example involving 150 previously-deposited layers, discussed above with reference to FIG. 3A.

Figure 3D:
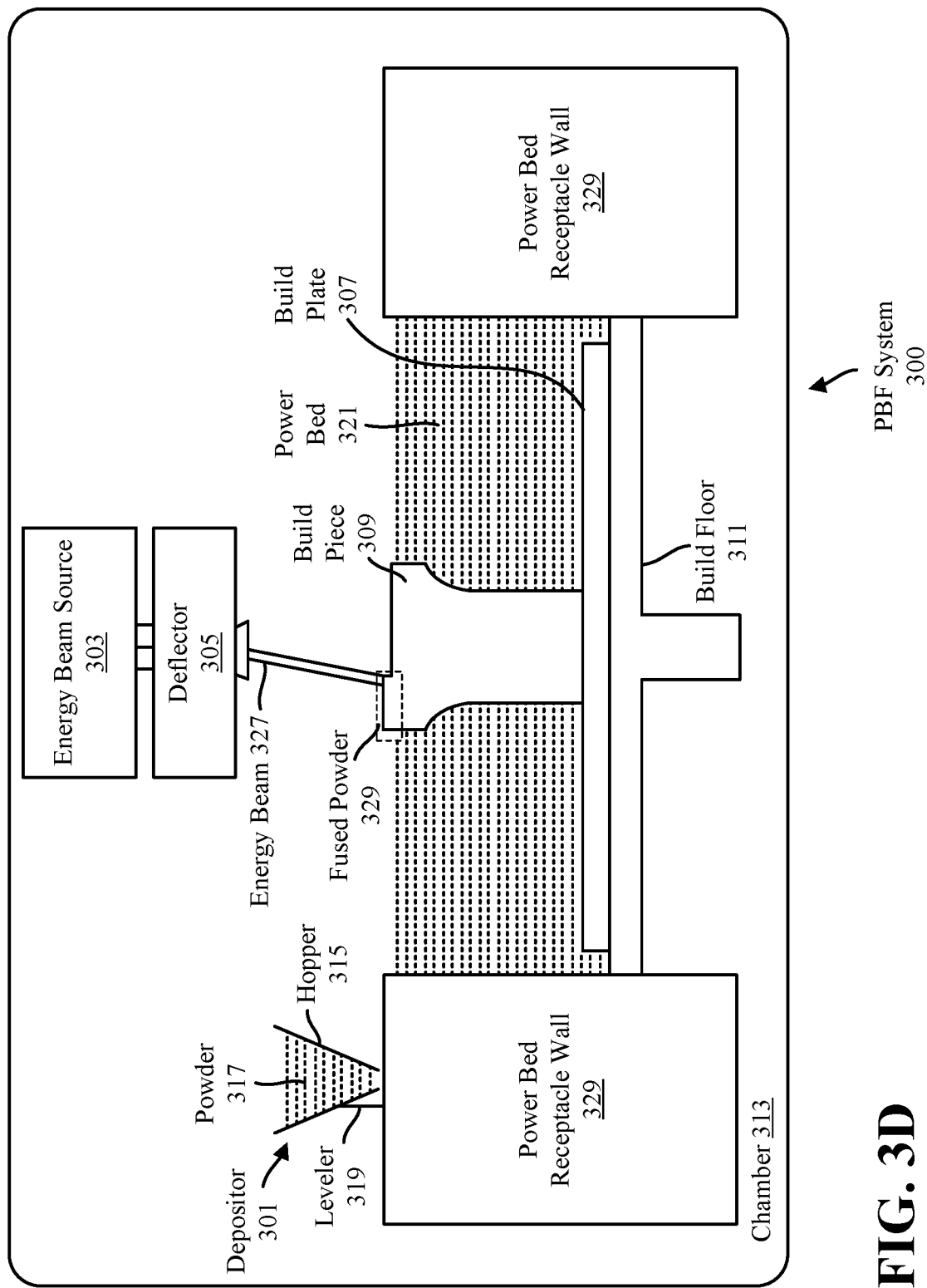

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various example embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The present disclosure provides various different embodiments of a selective end effector modular attachment device (SEE-MAD), which may be connected with a robot for assembly processes, including pre- and/or post-processing operations. It will be appreciated that various embodiments described herein may be practiced together. For example, an embodiment described with respect to one illustration of the present disclosure may be implemented in another embodiment described with respect to another illustration of the present disclosure.

Figure 4:
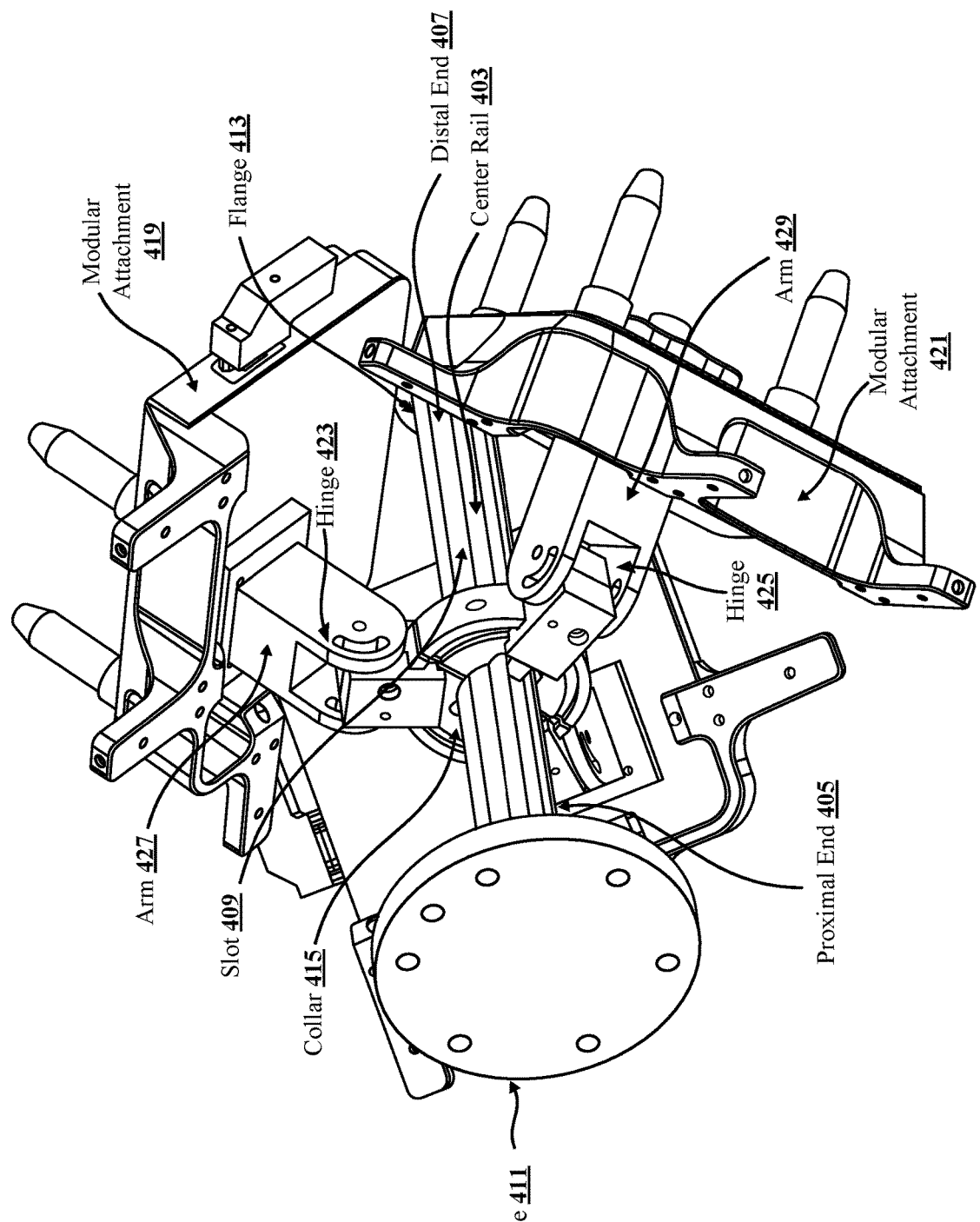
FIG. 4 illustrates a first perspective of a selective end effector modular attachment device.

FIG. 4 illustrates a perspective view of a SEE-MAD 400. SEE-MAD 400 may be employed in various operations associated with assembly of a node-based transport structure. As illustrated, SEE-MAD 400 shows various example embodiments, and other embodiments are possible without departing from the scope of the present disclosure. For example, embodiments of SEE-MAD 400 may not include one or both of a first modular attachment 419 and/or a second modular attachment 421; rather, modular attachments 419, 421 may be illustrative.

In various embodiments, SEE-MAD 400 may be composed of a plurality of components. Because SEE-MAD 400 may be implemented in assembly of node-based transport structures (e.g., automated assembly), one or more of the components may be machined with a relatively great deal of precision, e.g., in order to allow relatively accurate positioning of nodes, parts, and/or other structures during pre-assembly, assembly, and/or post-assembly operations associated with node-based transport structures.

The components of SEE-MAD 400 may be composed of any material suitable for supporting modular attachment devices, e.g., modular attachment devices that may engage with nodes, parts, structures, and/or be used in any number of various pre-assembly, assembly, and/or post-assembly operations. For example, the components of SEE-MAD 400 may be constructed of steel, aluminum, titanium, a composite metal, or another metal.

SEE-MAD 400 may include a center rail 403, which may also be known as an extension in some embodiments. As illustrated, center rail 403 may be approximately cylindrical in shape; however, other embodiments are possible. Center rail 403 may be greater in length than in diameter (e.g., when center rail 403 is configured as a cylinder) or greater than length than in both width and height. Center rail 403 may have a proximal end 405 and a distal end 407, which may be located at approximately opposite ends of center rail 403. Center rail 403 may be machined with a relatively great deal of precision. Therefore, center rail 403 may be suitable for various operations associated with assembly of node-based transport structures.

In some embodiments, center rail 403 may include at least one slot 409. Slot 409 may be a depression, groove, passage, and/or keyway. Slot 409 may extend over a majority or all of center rail 403, including over the center of center rail 403. Slot 409 may be greater in length than in at least one of width and/or depth.

Slot 409 may be machined into center rail 403 or fabricated with center rail 403, e.g., with a relatively great deal of precision commensurate with the assembly of node-based transport structures. In some embodiments, center rail 403 may include at least one other slot, which may be of the same or different dimensions (e.g., length, depth, width, etc.) as slot 409.

At least one of proximal end 405 and/or distal end 407 may be connected with a flange. A flange may be configured to connect with one or more apparatuses (e.g., tools and/or robots) so that SEE-MAD 400 may connect with the one or more apparatuses. As illustrated, proximal end 405 of center rail 403 may be connected with a first flange 411, and distal end 407 may be connected with a second flange 413.

First flange 411 may be configured to interface with one or more robots (e.g., at robotic arms) associated with assembly of node-based transport structures. For example, first flange 411 may be configured to interface with robots of different brands, sizes, and/or configurations.

Figure 6:
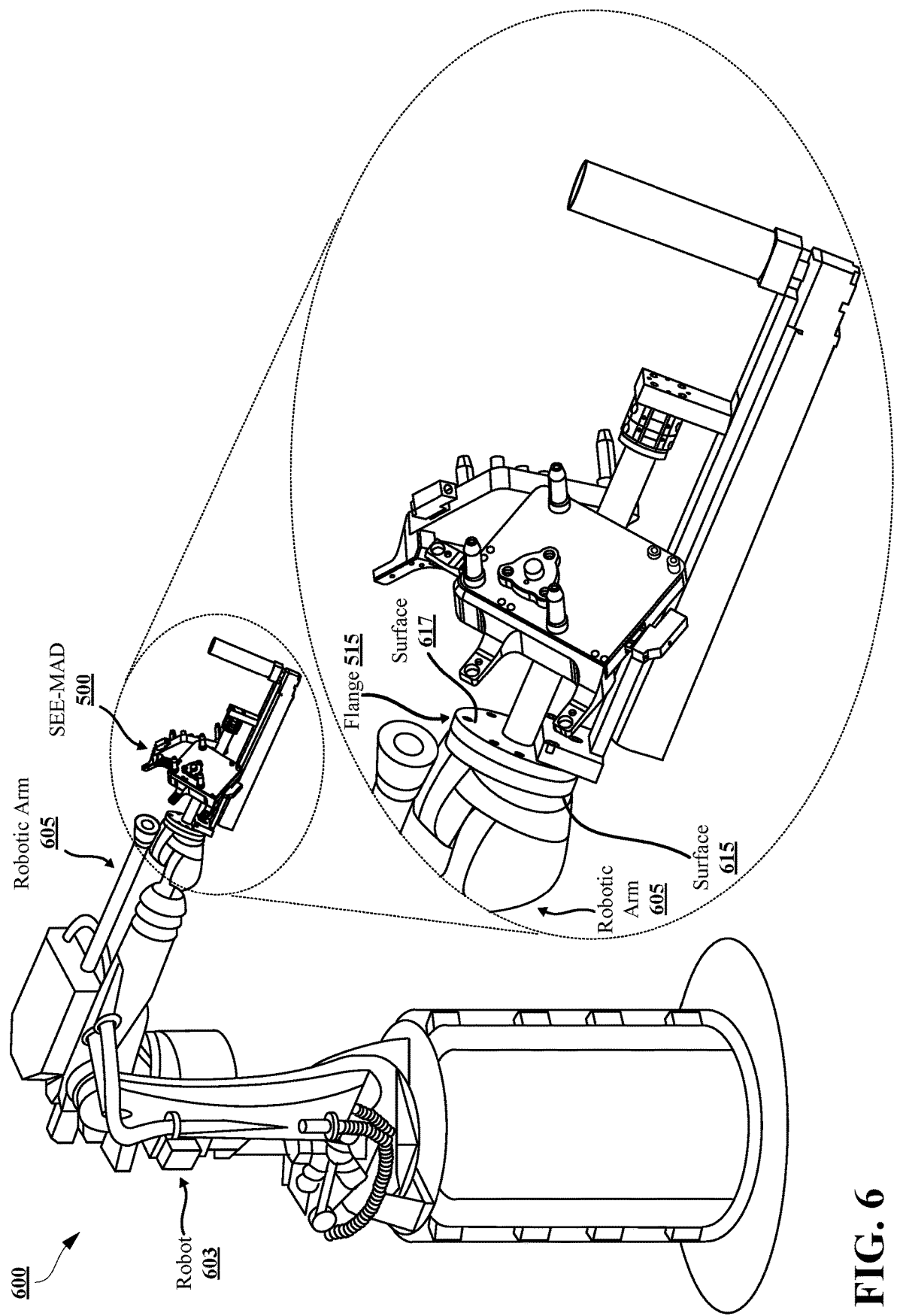
FIG. 6 illustrates a selective end effector modular attachment device connected with a robot.

In one embodiment, second flange 413 may be configured to interface with one or more tool-related components, including tool changers, grippers, and/or other tools (e.g., tools configured to be positioned at the end of a robotic arm). In some embodiments, at least one of flanges 411, 413 may be configured to interface with both robots (e.g., as shown in FIG. 6 below) and tool-related components.

In various embodiments, SEE-MAD 400 may include a collar 415 disposed around center rail 403. For example, collar 415 may be a circular racetrack collar. In some other embodiments, collar 415 may be a shaft collar and/or may be similar to a gear.

Collar 415 may be positioned between first flange 411 and second flange 413. Collar 415 may be configured for movement along center rail 403, e.g., between first flange 411 and second flange 413. In one embodiment, collar 415 may be configured to engage or connect with slot 409, such as by interlocking with slot 409. Slot 409 may guide movement of collar 415 along center rail 403. Accordingly, collar 415 may move in one or more of a potential six degrees of freedom (6DoF). For example, a potential 6DoF may include forward/backward (e.g., surge), up/down (e.g., heave), left/right (e.g., sway) for translation in space and may include yaw, pitch, and roll for rotation in space, and collar 415 may be configured for forward/backward (e.g., surge) movement for translation in space and/or roll movement for rotation in space.

SEE-MAD 400 may further include at least one arm. In the illustrated embodiment, SEE-MAD 400 includes a first arm 427 and a second arm 429; however, more or fewer arms may be present without departing from the scope of the present disclosure. Each of arms 427, 429 may be connected with collar 415.

At least one of arms 427, 429 may be a swivel arm, which may enable at least one of arms 427, 429 to turn or rotate when movement of collar 415 is absent. For example, collar 415 may provide roll movement for rotation in space (thereby causing roll movement of at least one of arms 427, 429), while at least one of arms 427, 429 may be configured for pitch movement in space (without causing pitch movement to collar 415).

In some embodiments, at least one of arms 427, 429 may include a hinge. For example, first arm 427 may include a first hinge 423, which may separate a lower portion of first arm 427 (nearest and connected with collar 415) from an upper portion of first arm 427 (nearest and connected with first modular attachment 419). Similarly, second arm 429 may include a second hinge 425, which may separate a lower portion of second arm 429 (nearest and connected with collar 415) from an upper portion of second arm 429 (nearest and connected with second modular attachment 421).

SEE-MAD 400 may be configured with one or more components that facilitate quick and/or simple interchanges between various modular attachments. Illustratively, each of arms 427, 429 may be configured to connect with a respective one of modular attachments 419, 421. In some embodiments, modular attachments 419, 421 may not be components of SEE-MAD 400, but are shown for example purposes. At least one of arms 427, 429 may be configured to connect with a variety of different modular attachments, such as tool-related components (e.g., tool changers, grippers, adhesive applicators, curing devices, and/or other tools).

At least one of arms 427, 429 may include one or more features for connecting with a respective one of modular attachments 419, 421. For example, at least one of arms 427, 429 may include male and/or female connector features, such as one or more protrusions (e.g., a tongue of a tongue-and-groove connection) and/or one or more holes (e.g., a threaded hole or a groove). In some embodiments, one or more of the features of at least one of arms 427, 429 may be configurable, e.g., so that different modular attachments may be interchangeably connected with at least one of arms 427, 429.

According to various embodiments, SEE-MAD 400 may be configured to provide 6DoF to at least one of modular attachments 419, 421. For example, first modular attachment 419 may be connected with center rail 403 through first arm 427 and collar 415. The movements of first arm 427 and collar 415 may cause movement of first modular attachment 419—illustratively, the movement of collar 415 may be configured to provide two degrees of freedom for movement of first modular attachment 419, and the movement of first arm 427 (including movement of first hinge 423) may provide four degrees of freedom for movement of first modular attachment 419. Therefore, the combination of configured movements by first arm 427 and collar 415 may provide 6DoF of movement for first modular attachment 419. Potentially, the movements of collar 415 and first arm 427 may provide greater than six degrees of freedom.

Illustratively, collar 415 may be configured to provide two degrees of freedom: forward/backward (e.g., surge) movement for translation in space and/or roll movement for rotation in space. First arm 427 may provide the remaining four degrees of freedom. For example, the swivel movement of first arm 427 may provide pitch movement for first modular attachment 419. First hinge 423 may provide left/right (e.g., sway) movement for translation in space of first modular attachment 419. The combination of first hinge 423 and the swivel movement of first arm 427 may provide yaw movement for rotation in space of first modular attachment 419. Further, first arm 427 may provide up/down (e.g., heave) movement of the first modular attachment 419 (e.g., first arm 427 may be at least partially extendable, which may move first modular attachment 419 up as first arm 427 is extended and down as first arm 427 is retracted).

In some embodiments, SEE-MAD 400 may be configured to accept additional and/or alternative modules. Such modules may not be necessarily connected with a collar (e.g., collar 415) and/or an arm (e.g., arms 427, 429). Rather, a module may be connected to center rail 403 (e.g., directly connected), and the module may interface with slot 409. That is, slot 409 may be configured to connect center rail 403 with a module. Slot 409 may provide relatively accurate positioning and/or fixturing of the module—e.g., slot 409 may provide radial and/or axial positioning of the module along center rail 403.

Figure 5:
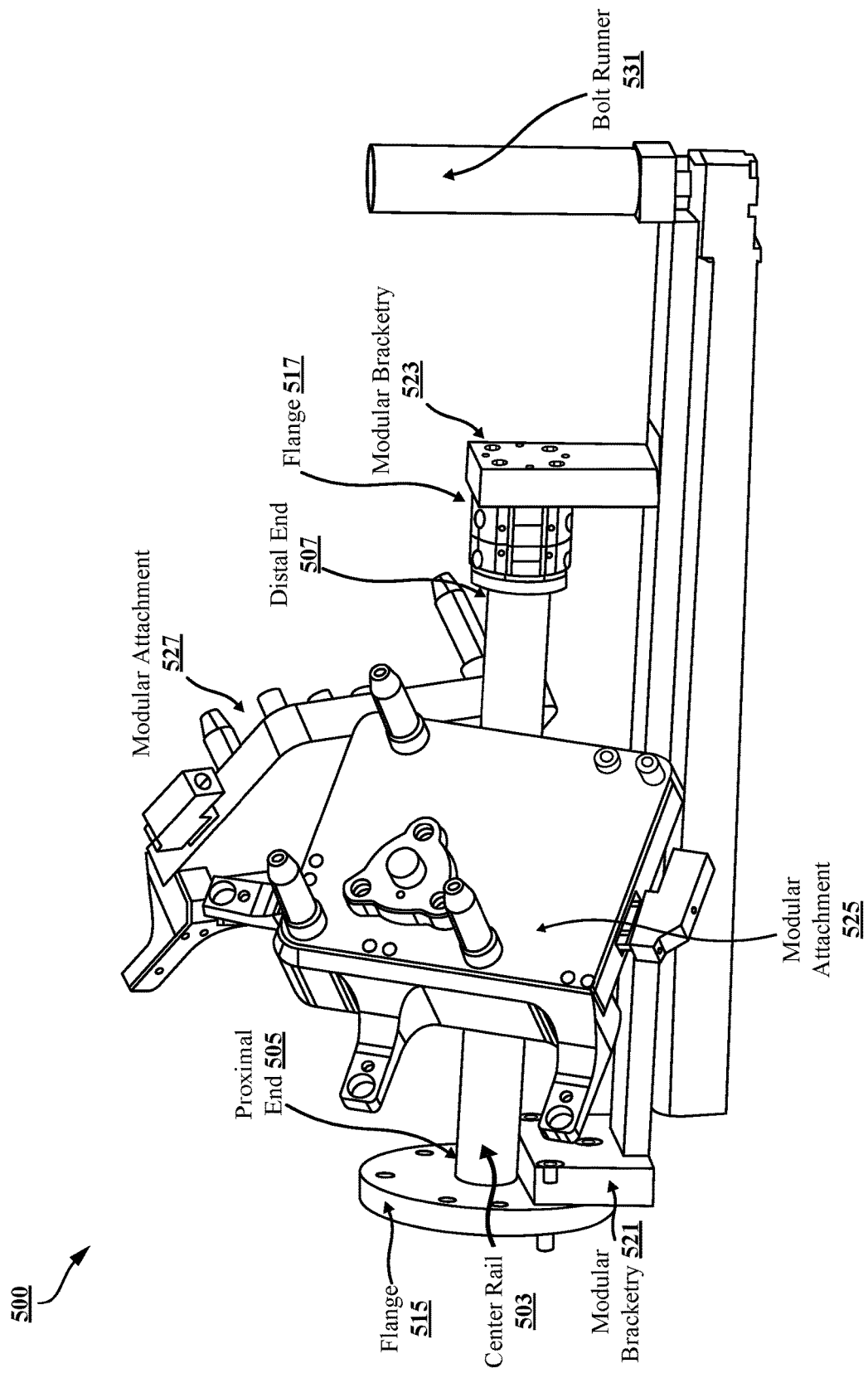
FIG. 5 illustrates a second perspective of a selective end effector modular attachment device.

With reference to FIG. 5, a second perspective of a SEE-MAD 500 is illustrated. SEE-MAD 500 may be an embodiment of SEE-MAD 400 of FIG. 4. In the illustrated perspective, SEE-MAD 500 may include a center rail 503 having a proximal end 505 and a distal end 507. A first flange 515 may be connected with center rail 503 at proximal end 505, and a second flange 517 may be connected with center rail 503 at distal end 507. Center rail 503 may be connected with at least one of a first modular attachment 525 and/or a second modular attachment 527, each of which may be connected with center rail 503 through respective arms and a collar disposed around the center rail (e.g., arms 427, 429 connected with collar 415 disposed around center rail 403 illustrated in FIG. 4).

SEE-MAD 500 may be configured to connect with modular bracketry and/or bracing, which may be configured to provide additional support, reach, functionality, and so forth. For example, at least one of first flange 515 and/or second flange 517 may be connected with a respective one of a first modular bracketry 521 or a second modular bracketry 523. Thus, a robot may use SEE-MAD 500 in a variety of tasks and/or orientations (e.g., as shown in FIG. 6 below).

As illustrated, SEE-MAD 500 may be configured to connect with a tool-related component, such as a bolt runner 531 or another tool-related component. For example, SEE-MAD 500 may be configured to connect with bolt runner 531 through modular bracketry 521, 523. First flange 515 may be configured to engage with first modular bracketry 521, and second flange 517 may be configured to engage with second modular bracketry 523.

In some embodiments, flanges 515, 517 may include one or more features for connecting with modular bracketry 521, 523. For example, at least one of flanges 515, 517 may be partially or completely perforated by an aperture or hole, which may be threaded. One or more holes of the at least one of flanges 515, 517 may be configured to receive a fastening component, such as a bolt and/or screw. Accordingly, the at least one of flanges 515, 517 may be fastened (e.g., bolted and/or screwed) to the respective one of modular bracketry 521, 523. When SEE-MAD 500 is connected with another apparatus (e.g., a tool-related component, such as bolt runner 531), at least one of flanges 515, 517 may anchor SEE-MAD 500 when fastened to a respective modular bracketry 521, 523.

In reference to FIG. 6, SEE-MAD 500 is illustrated in one embodiment. In the illustrated embodiment, SEE-MAD 500 may be connected with a robot 603, and specifically, at a robotic arm 605 of robot 603. For example, SEE-MAD 500 may be connected with robot 603 at robotic arm 605 through at least first flange 515.

First flange 515 may be configured to interface with the robotic arm 605 for the connection to robot 603. For example, first flange 515 may include one or more interface features on a first surface 615 of first flange 515. The one or more interface features may be configured to engage with one or more fastening mechanisms, which may secure SEE-MAD 500 to robotic arm 605 during various assembly operations. For example, the one or more interface features may include male and/or female receiver features and/or holes (e.g., threaded holes) for receiving bolts and/or screws.

The second surface 617 of first flange 515 may be opposite the first surface 615 and may be configured to modular bracketry, as described in FIG. 5. Accordingly, first flange 515 may contemporaneously connect with robot 603 and modular bracketry so that SEE-MAD 500 may be simultaneously connected with one or more of a robot, tool-related component, and/or modular attachment.

In some embodiments, SEE-MAD 500 may be attachable to robotic arm 605, and thus, SEE-MAD 500 may be removable from robot 603. As such, SEE-MAD 500 may be configured to connect with at least two different robots. According to such a configuration, SEE-MAD 500 may be used in different assembly operations, for example, including pre- and/or post-assembly operations.

In some other embodiments, SEE-MAD 500 may be built onto or integrated with robotic arm 605. For example, first flange 515 may be welded to or fabricated with robotic arm 605. However, SEE-MAD 500 may be configured to be built onto or integrated with different robotic arms of different robots.

The present disclosure is provided to enable any person skilled in the art to practice the various aspects described herein. Various modifications to these exemplary embodiments presented throughout the present disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
    a center rail having a distal end and a proximal end;
    a first flange connected with the proximal end;
    a second flange connected with the distal end;
    a collar disposed around the center rail and between the first flange and the second flange; and
    at least one arm connected with the collar, wherein the at least one arm is configured to connect with a modular attachment, and
    wherein the disposal of the collar around the center rail is configured to provide at least two degrees of freedom for movement of the modular attachment including roll movement by the collar for rotation in space.

2. The apparatus of claim 1, wherein the at least one arm is configured to provide at least four degrees of freedom for the movement of the modular attachment including pitch movement, sway movement, swivel movement, and heave movement.

3. The apparatus of claim 2, wherein the at least one arm includes at least one hinge configured to provide at least one of the four degrees of freedom.

4. The apparatus of claim 2, wherein the collar is configured for movement along the center rail between the first flange and the second flange, and wherein the movement along the center rail is configured to provide at least one of the at least two degrees of freedom.

5. The apparatus of claim 1, wherein the center rail includes at least one slot configured to connect with at least one module, and provide at least one of radial positioning or axial positioning.

6. The apparatus of claim 1, further comprising:
    a bracket connected with at least one of the first flange or the second flange.

7. The apparatus of claim 6, wherein the bracket is disposed between the first flange and the collar.

8. The apparatus of claim 6, wherein the second flange is disposed between the bracket and the collar.

9. The apparatus of claim 6, wherein the bracket is configured to connect with a bolt runner.

10. The apparatus of claim 1, wherein at least one of the first flange and the second flange includes a threaded hole configured to receive a fastening component.

11. The apparatus of claim 1, wherein the first flange is configured to interface with one or more robots.

12. The apparatus of claim 1, wherein the second flange is configured to interface with one or more tool-related components.

13. The apparatus of claim 1, wherein the at least one arm is partially extendable.

* * * * *